US010725264B2

(12) United States Patent
Takama et al.

(10) Patent No.: US 10,725,264 B2
(45) Date of Patent: Jul. 28, 2020

(54) LENS TUBE AND IMAGING SYSTEM HAVING THE SAME

(71) Applicant: DENSO CORPORATION, Kariya, Aichi-pref. (JP)

(72) Inventors: Daisuke Takama, Kariya (JP); Noboru Kawasaki, Kariya (JP); Takayuki Kimura, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 0 days.

(21) Appl. No.: 16/548,131

(22) Filed: Aug. 22, 2019

(65) Prior Publication Data

US 2019/0377150 A1 Dec. 12, 2019

Related U.S. Application Data

(63) Continuation of application No. 16/183,248, filed on Nov. 7, 2018, now Pat. No. 10,429,605, which is a (Continued)

(30) Foreign Application Priority Data

Jul. 18, 2013 (JP) ................................ 2013-149807

(51) Int. Cl.

| | |
|---|---|
| ***G02B 7/02*** | (2006.01) |
| ***G03B 17/12*** | (2006.01) |
| ***H04N 5/225*** | (2006.01) |

(52) U.S. Cl.

CPC ............... *G02B 7/021* (2013.01); *G02B 7/02* (2013.01); *G03B 17/12* (2013.01); *H04N 5/2253* (2013.01);

(Continued)

(58) Field of Classification Search

CPC .......... G02B 7/02; G02B 7/021; G03B 17/12; H04N 5/2253; H04N 5/2254; H04N 5/2257

See application file for complete search history.

(56) References Cited

U.S. PATENT DOCUMENTS

2004/0223074 A1* 11/2004 Takada .................. G02B 7/026 348/360
2006/0181633 A1* 8/2006 Seo ..................... H04N 5/2251 348/340

(Continued)

FOREIGN PATENT DOCUMENTS

JP 2006-337917 12/2006
JP 2007-094334 4/2007

(Continued)

OTHER PUBLICATIONS

International Preliminary Report on Patentability; International Application No. PCT/JP2014/068291; Filed: Jul. 9, 2014 (with English translation).

(Continued)

*Primary Examiner* — Amy R Hsu
(74) *Attorney, Agent, or Firm* — Maschoff Brennan

(57) ABSTRACT

The lens tube includes a cylindrical barrel, a holder, a cap, and a stress applying portion. The barrel houses at least one first lens. The holder houses an imaging element and is fixed to a substrate. The holder is configured to allow one end of the barrel in an axial direction to be screwed into the holder such that an optical axis of the first lens and an optical axis of the imaging element are aligned with each other. The cap is mountable to the barrel by allowing the other end of the barrel in the axial direction to be screwed into the cap. The stress applying portion is located between the holder and the cap when the barrel is screwed into the holder and the cap, and applies a stress in a direction in which the cap is (Continued)

OPTICAL AXIS 1 2 20 21 22 3 4 5 30b 42 43 32 41 31 39 40b 6c 40a 6b 6a 30a 90 91 separated from the holder. The first lens is held and fixed between a first stopper formed on the cap and a second stopper formed in the barrel when the cap is mounted to the barrel.

17 Claims, 3 Drawing Sheets

Related U.S. Application Data continuation of application No. 16/002,281, filed on Jun. 7, 2018, now Pat. No. 10,281,677, which is a continuation of application No. 15/821,249, filed on Nov. 22, 2017, now Pat. No. 10,146,025, which is a continuation of application No. 14/905,717, filed as application No. PCT/JP2014/068291 on Jul. 9, 2014, now Pat. No. 9,857,552.

(52) U.S. Cl.
CPC ......... *H04N 5/2254* (2013.01); *H04N 5/2257* (2013.01)

(56) References Cited

U.S. PATENT DOCUMENTS

2007/0076305 A1* 4/2007 Kuroda ................ H04N 9/3105 359/726
2007/0115566 A1* 5/2007 Miyazawa ............... G02B 7/02 359/811
2009/0316282 A1* 12/2009 Chang .................... G02B 7/025 359/819
2010/0079879 A1* 4/2010 Sasaki .................... G02B 7/023 359/822
2011/0013293 A1* 1/2011 Kawasaki ............ G02B 13/003 359/793
2011/0234803 A1* 9/2011 Nakajima ............ H04N 5/2254 348/148
2012/0019905 A1* 1/2012 Teraoka ................. G02B 7/021 359/356
2012/0133825 A1* 5/2012 Nakajima ............ H04N 5/2253 348/374
2013/0063831 A1* 3/2013 Lin ...................... G02B 3/0081 359/823
2013/0265662 A1* 10/2013 Araie ....................... G02B 7/02 359/827
2016/0170167 A1 6/2016 Takama et al.
2018/0095236 A1 4/2018 Takama et al.
2018/0284383 A1 10/2018 Takama et al.
2019/0072742 A1 3/2019 Takama et al.

FOREIGN PATENT DOCUMENTS

JP 2009-162822 7/2009
JP 2010-085716 4/2010
JP 2010-156734 7/2010
JP 2011-209417 10/2011
JP 2013-037189 2/2013
WO WO 2010/061604 6/2010
WO WO 2015/008675 1/2015

OTHER PUBLICATIONS

International Search Report (translated version); International Application No. PCT/JP2014/068291, filed Jul. 9, 2014; 11 pages.

* cited by examiner 90
2
1
5
3
4
42
42
42
42
42
42

(a)

(b)

LENS TUBE AND IMAGING SYSTEM HAVING THE SAME

CROSS-REFERENCE TO RELATED APPLICATION

This application is a continuation application of U.S. application Ser. No. 16/183,248, filed on Nov. 7, 2018, which is a continuation application of U.S. application Ser. No. 16/002,281, filed on Jun. 7, 2018, which is a continuation of U.S. application Ser. No. 15/821,249, filed on Nov. 22, 2017, which is a continuation application of U.S. application Ser. No. 14/905,717, filed on Jan. 15, 2016, now U.S. Pat. No. 9,857,552, issued on Jan. 2, 2018, which is a national stage application under 35 USC § 371(c) of PCT Application No. PCT/JP2014/068291, filed on Jul. 9, 2014, which claims priority from Japanese Patent Application No. 2013-149807, filed Jul. 18, 2013. The entire disclosures of all of the above applications are incorporated herein by reference.

TECHNICAL FIELD

The present invention relates to a lens tube and an imaging system such as a vehicle camera having the lens tube.

BACKGROUND ART

A lens tube described in PTL 1 includes a holder (fixed cylinder) fixed to a substrate to which a CCD (charge coupled device) is mounted and a barrel (cam cylinder) that houses a lens. The barrel is fixed to the holder such that the optical axis of the CCD is aligned with the optical axis of the lens. The lens tube has an elastic piece disposed in the holder so that the barrel is biased by the elastic piece, thereby preventing backlash of the barrel.

CITATION LIST

Patent Literature

[PTL 1] JP-A-2009-162822

SUMMARY OF THE INVENTION

Technical Problem

However, the lens tube described in PTL 1 has a problem that the holder increases in size due to the elastic piece disposed in the holder. In particular, the problem is significant when the lens tube is applied to a vehicle camera. For example, when a camera module increases in size due to a large-sized lens tube, the front monitoring camera made up of the camera module blocks the vehicle driver's view since the front monitoring camera is mounted in a vehicle in proximity to a rear view mirror.

Accordingly, the present invention has been made to provide a lens tube having a small-sized holder while preventing backlash of the barrel.

Solution to Problem

A lens tube according to the present invention includes a barrel, a holder, a cap, and a stress applying portion. The barrel is formed so as to house at least one first lens. The barrel is formed into a cylindrical shape. The holder houses an imaging element and is fixed to a substrate. The holder is configured to allow one end of the barrel in an axial direction to be screwed into the holder such that an optical axis of the first lens and an optical axis of the imaging element are aligned with each other. The cap is mountable to the barrel by allowing the other end of the barrel in the axial direction to be screwed into the cap. The stress applying portion is located between the holder and the cap when the barrel is screwed into the holder and the cap, and applies a stress in a direction in which the cap is separated from the holder.

In the lens tube, the first lens is held and fixed between a first stopper formed on the cap and a second stopper formed in the barrel when the cap is mounted to the barrel. In the lens tube, when the cap is mounted to the barrel which houses the first lens, the first lens is fixed in the barrel. When the barrel with the cap is mounted to the holder, the stress applying portion is held between the cap and the holder. As a result, a stress in a direction in which the cap is separated from the holder is applied on the cap.

Accordingly, in use of the lens tube, when the threads are formed so as to allow the barrel to be screwed into the holder, the respective threads reliably engage with each other, thereby preventing backlash of the barrel to the holder.

Moreover, the lens tube has the stress applying portion as a configuration for preventing backlash. The stress applying portion disposed external to the holder. Accordingly, the holder of the lens tube does not need to be increased in size to house the stress applying portion, thereby achieving the small-sized holder.

Further, reference characters in the parenthesis which refer to the components described in the claims are one example which shows a corresponding relationship to the specific components described in the embodiment below. The present invention is not limited to the specific components denoted by the reference characters of the components in the parentheses that are shown in the claims.

DESCRIPTION OF EMBODIMENTS

An embodiment of the present invention will be described below with reference to the drawings.

Figure 1:
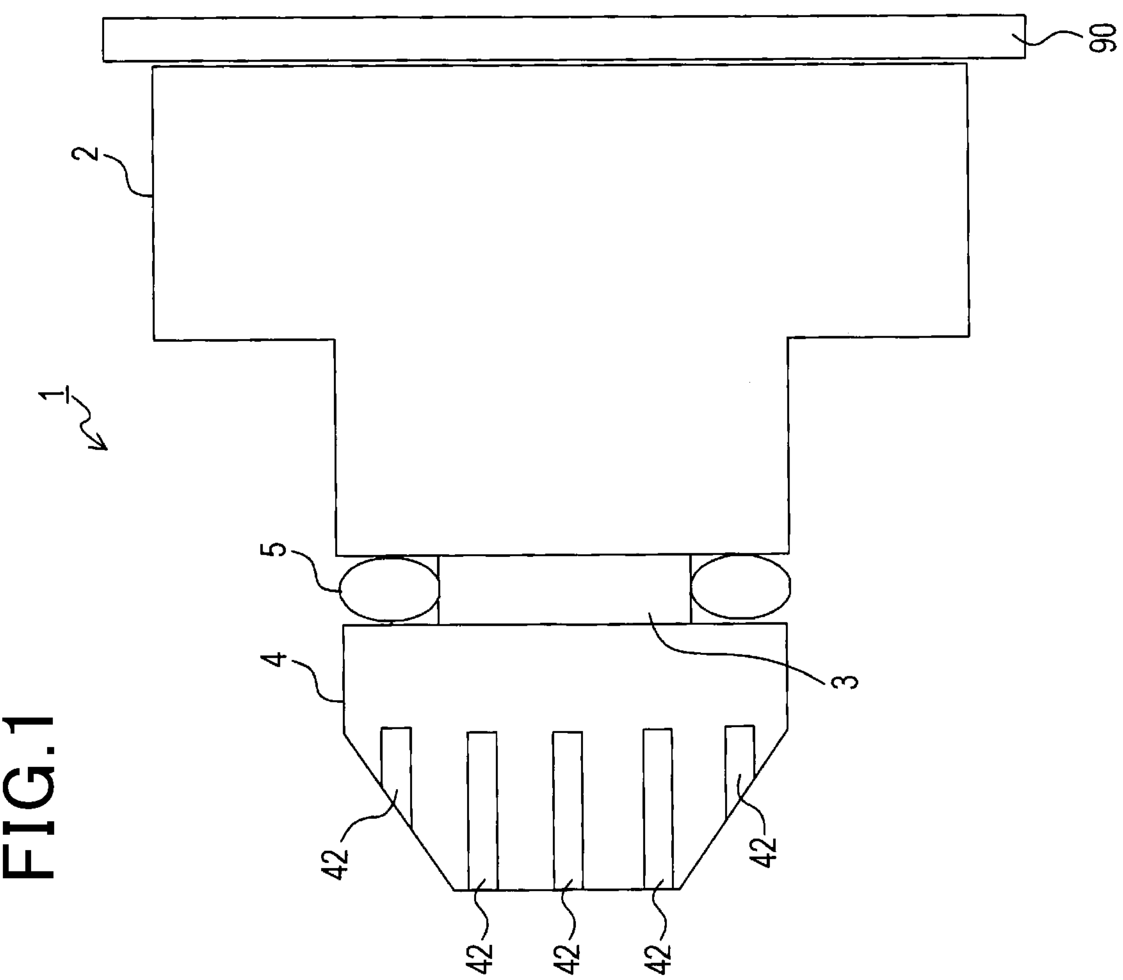
FIG. 1 is a side view of a lens tube according to an embodiment.

A lens tube 1 according to the present embodiment shown in FIG. 1 is used for a front monitoring camera (imaging system) of a vehicle. As shown in FIG. 1, the camera includes an imager made up of an imaging element such as CCD element, which is described below, and a substrate 90 to which the imager is mounted. The lens tube 1 according to present embodiment is fixed on a surface of the substrate 90 to which the imager is mounted.

As shown in FIG. 1, the lens tube 1 includes a holder 2, a barrel 3 screwed into the holder 2, a cap 4 mounted to the barrel 3, and an O-ring 5. The holder 2 has a large-diameter cylindrical portion 20 having a large diameter, and a small-diameter cylindrical portion 21 (mounting section) having a small diameter. The large-diameter cylindrical portion 20 and the small-diameter cylindrical portion 21 are formed into a shape such that their center axes are positioned on the same axis and they are arranged in parallel with each other in the axial direction to form a step portion. The barrel 3 is formed into a cylindrical shape. The cap 4 is formed into a cylindrical shape in which an outer surface of one end in the axial direction is formed into a tapered shape. The O-ring 5 is formed into an annular shape that allows the barrel 3 to be inserted therein.

Figure 2:
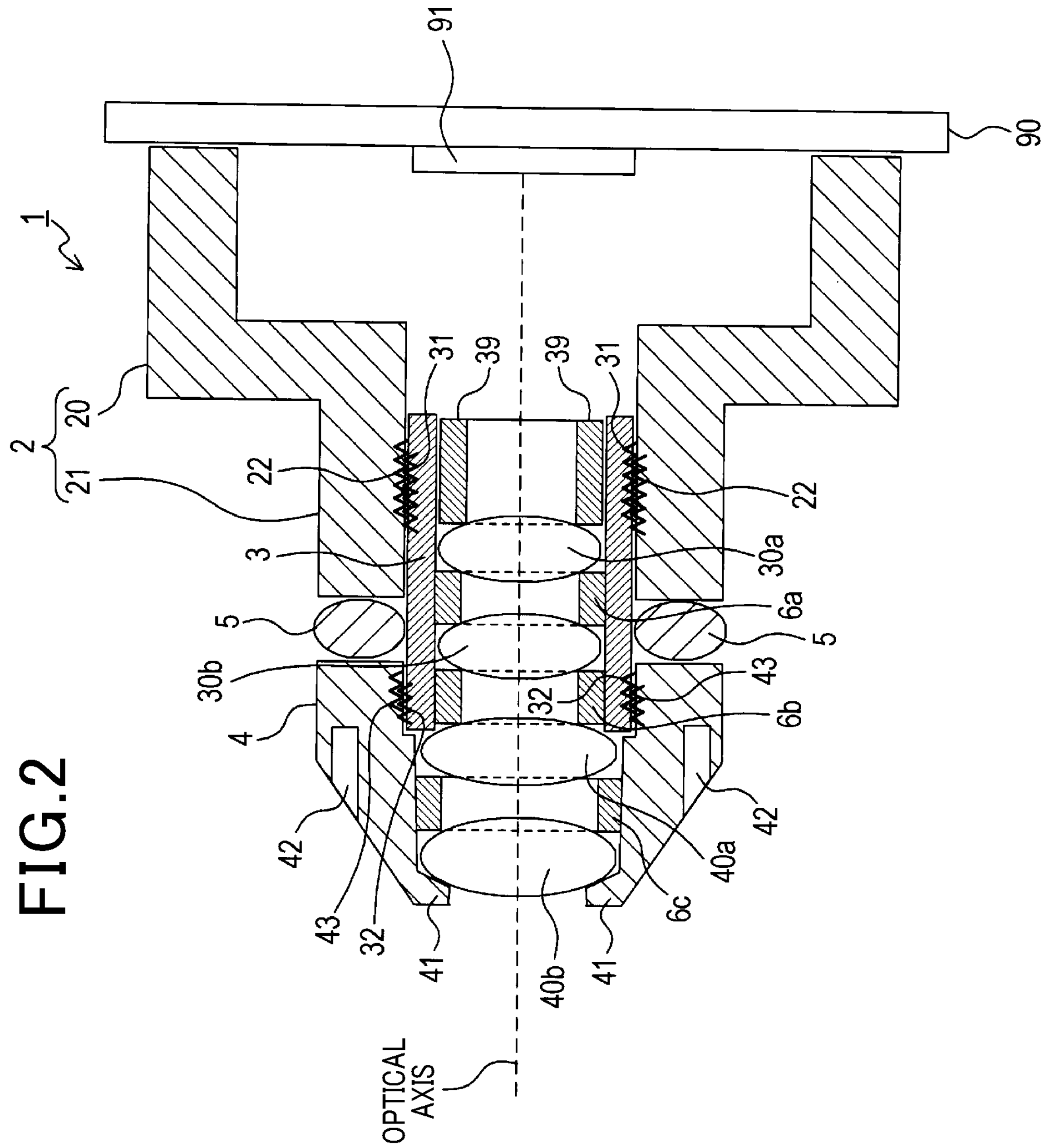
FIG. 2 is a cross sectional view of the lens tube according to the embodiment taken along a plane including an optical axis of the lens tube (cross sectional view of the lens tube except for lenses)

With reference to FIG. 2, elements of the lens tube 1 will be described in detail.

First, the holder 2 will be described.

The large-diameter cylindrical portion 20 of the holder 2 is fixed on the substrate 90 such that the optical axis of the imager 91 and the center axis of the holder 2 (in other word, the center axes of the large-diameter cylindrical portion 20 and the small-diameter cylindrical portion 21), that is, the optical axis of the lens tube 1 are aligned with each other. Further, the small-diameter cylindrical portion 21 of the holder 2 has an inner wall surface having a thread (first thread) 22 formed about the center axis of the small-diameter cylindrical portion 21. In the following description, a direction in the optical axis of the imager 91 from the imager 91 to the small-diameter cylindrical portion 21 is defined as a front direction, and a direction from the small-diameter cylindrical portion 21 to the imager 91 is defined as a rear direction.

Next, the barrel 3 will be described.

The barrel 3 is formed into a cylindrical shape which is sized to be screwed into the small-diameter cylindrical portion 21 of the holder 2 in a coaxial manner. The barrel 3 has a thread 31 on the outer peripheral surface on one end (the rear end) in the axial direction of the barrel 3 so as to be engageable with the thread 22 of the holder 2. The barrel 3 further has a thread 32 on the outer peripheral surface on the other end (the front end) in the axial direction of the barrel 3. The rear end of the barrel 3 is inserted into the small-diameter cylindrical portion 21 until the thread 22 of the small-diameter cylindrical portion 21 abuts the thread 31 of the barrel 3. Then, as the barrel 3 is rotated about the axis, the thread 22 and the thread 31 are engaged each other so that the barrel 3 is screwed into the small-diameter cylindrical portion 21 and is coaxially fixed to the small-diameter cylindrical portion 21.

The barrel 3 houses a lens (first lens) 30*a*, a lens (first lens) 30*b*, a spacer (first spacer) 6*a*, a spacer (second spacer) 6*b*, and a fixed ring 39. The fixed ring 39 is formed into a tubular shape. The fixed ring 39 is disposed on the rear end in the barrel 3 and is fixed to the barrel 3 in a coaxial manner.

The spacer 6*a* and the spacer 6*b* are each formed into an annular shape and are housed in the barrel 3 in a coaxial manner. The lens 30*a*, the lens 30*b*, the spacer 6*a*, and the spacer 6*b* are arranged in the barrel 3 in the order of the lens 30*a*, the spacer 6*a*, the lens 30*b*, and the spacer 6*b* from the fixed ring 39 toward the front end of the barrel 3.

The lens 30*a* and the lens 30*b* are housed in the barrel 3 such that their optical axes and the center axis of the barrel 3 are aligned with each other. The lens 30*a* is held and fixed between the fixed ring 39 and the spacer 6*a* when housed in the barrel 3. The lens 30*b* is held and fixed between the spacer 6*a* and the spacer 6*b* when housed in the barrel 3.

Next, the cap 4 will be described.

The cap 4 is formed in a cylindrical shape and contains a space surrounded by an inner peripheral surface on the rear end in the axial direction. The space is formed to allow the front end of the barrel 3 having the thread 32 to be inserted in the space. A portion of the barrel 3 which contains the space has the inner peripheral surface on which a thread (second thread) 43 is formed. The thread 43 is threaded in the same direction as that of the thread 22 which is formed on the small-diameter cylindrical portion 21 of the holder 2.

The front end of the barrel 3 is inserted into the portion of the cap 4 on which the thread 43 is formed until the thread 32 on the barrel 3 abuts the thread 43. Then, as the barrel 3 is rotated about the center axis, the thread 32 and the thread 43 are engaged each other so that the front end of the barrel 3 is screwed into the cap 4 and the cap 4 is fixed to the barrel 3.

Further, the outer peripheral surface of the cap 4 on the other end (the front end) in the axial direction forms a tapered shape which decreases in the direction toward the tip on the other end. A plurality of hole portions 42 for slip prevention are formed on the tapered portion about the center axis of the cap 4 with equal spaces therebetween (see FIG. 1).

The cap 4 contains a space which houses a lens (second lens) 40*a*, a spacer (third spacer) 6*c*, and a lens (second lens) 40*b*. The space is disposed on the other end (front end) in the axial direction adjacent to the space in which the barrel 3 is inserted. The space has a diameter smaller than that of the space in which the barrel 3 is inserted. The difference in diameter forms a step portion at the boundary between the space in which the barrel 3 is inserted and the space in which the lens 40*a* and the like are disposed. The barrel 3 can be inserted into the cap 4 until it abuts against the step portion.

The cap 4 has a claw portion 41. The claw portion 41 is formed circumferentially at the edge of the cap 4 on the front side in the axial direction so as to extend from the edge toward the axis center of the space which houses the lens 40*a*, the lens 40*b*, and the spacer 6*c*.

The lens 40*b*, the lens 40*a*, and the spacer 6*c* are arranged in the cap 4 in the order of the lens 40*b*, the spacer 6*c*, and the lens 40*a* from the claw portion 41 to the rear end of the cap 4. The lens 40*b* is held and fixed between the claw portion 41 and the spacer 6*c*. The lens 40*a* is held and fixed between the spacer 6*c* and the spacer 6*b* which is housed in the barrel 3 which is screwed into the cap 4.

Next, the O-ring 5 will be described. The O-ring 5 is a rubber ring formed into an annular shape that allows the barrel 3 to be inserted therein. When the barrel 3 is inserted in the small-diameter cylindrical portion 21 of the holder 2 and the cap 4, the O-ring 5 is held between the front end of the small-diameter cylindrical portion 21 of the holder 2 and the rear end of the cap 4. When held between the holder 2 and the cap 4, the O-ring 5 applies a stress on the cap 4 in the forward direction.

The lens tube 1 having the above configuration is assembled as described below.

First, the holder 2 is mounted to the substrate 90. Here, the holder 2 is fixed to the substrate 90 such that the imager 91 is positioned at the center of an opening port of the large-diameter cylindrical portion 20. The holder 2 may be fixed by screwing, adhesion, or any other method.

The lenses 30*a*, 30*b* and the spacers 6*a*, 6*b* are housed in the barrel 3, while the lens 40*a*, 40*b* and the spacer 6*c* are housed in the cap 4. Then, the cap 4 is rotated about the axis and tightened until an axial force is applied on the barrel 3. In so doing, the lenses 40*a*, 40*b* and the spacer 6*c* in the cap 4 are fixed in the cap 4 held between the claw portion 41 and the spacer 6*b* in the barrel 3. Further, the lenses 30*a*, 30*b* and the spacers 6*a*, 6*b* in the barrel 3 are also fixed in the barrel 3 held between the fixed ring 39 and the lens 40*a*.

Accordingly, the lenses 30*a*, 30*b*, 40*a*, 40*b* are fixed in the barrel 3 and the cap 4 with the respective optical axes aligned. Then, the O-ring 5 is mounted to the barrel 3, and the barrel 3 to which the cap 4 is mounted is screwed into the holder 2. Accordingly, the barrel 3 and the cap 4 is mounted to the holder 2 with the optical axes of the lenses 30*a*, 30*b*, 40*a*, 40*b* fixed in the barrel 3 and the cap 4 and the optical axis of the imager 91 aligned.

In this embodiment, the threads 22, 31, 32, 43 are threaded in the same direction. As a result, when the barrel 3 is screwed into the holder 2, the cap 4 is not loosened from the barrel 3. Further, when the barrel 3 with the cap 4 is mounted to the holder 2, the O-ring 5 is held between the holder 2 and the cap 4. As a result, a stress in the forward direction is applied on the cap 4.

The aforementioned lens tube 1 has a characteristic effect as described below.

In the lens tube 1 of the present embodiment, when the barrel 3 having the cap 4 secured thereto is mounted to the holder 2 which is fixed to the substrate 90, the O-ring 5 is held between the cap 4 and the holder 2. As a result, the cap 4 is subject to a stress in the direction away from the holder 2 (forward direction).

Figure 3:
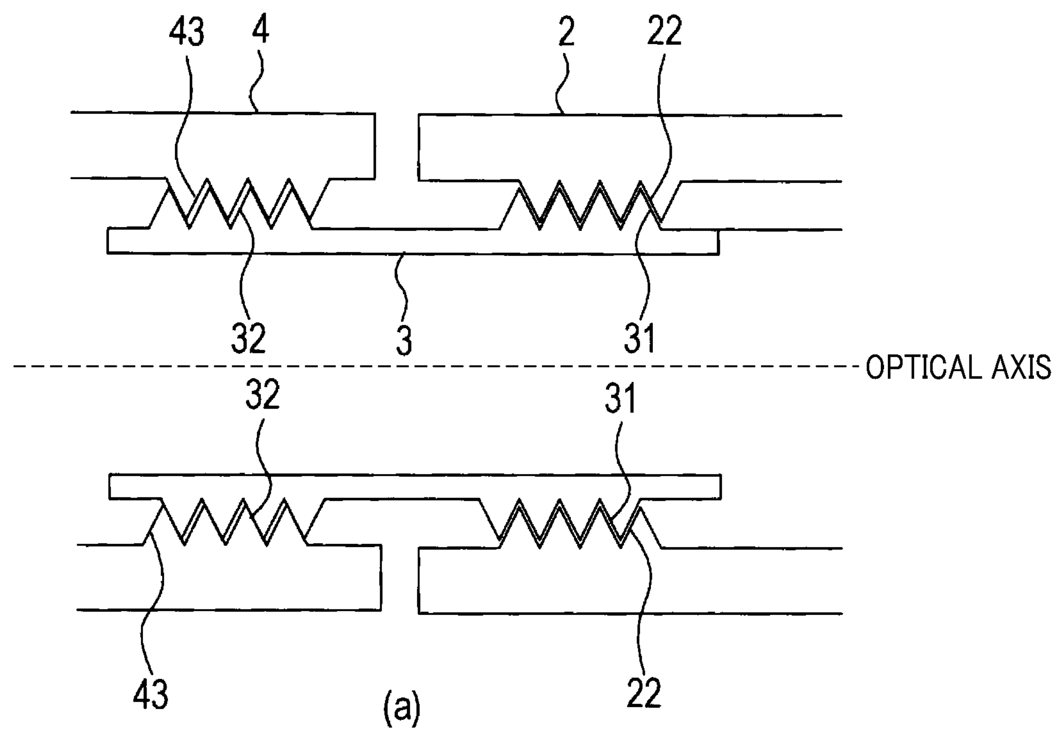
FIG. 3 is a schematic view which shows that threads formed on a holder and a cap configuring the lens tube according to the embodiment are brought into a close contact with threads formed on a barrel via an O-ring, in which (a) is a view before the O-ring is disposed, and (b) is a view after the O-ring is disposed.
Figure 3:
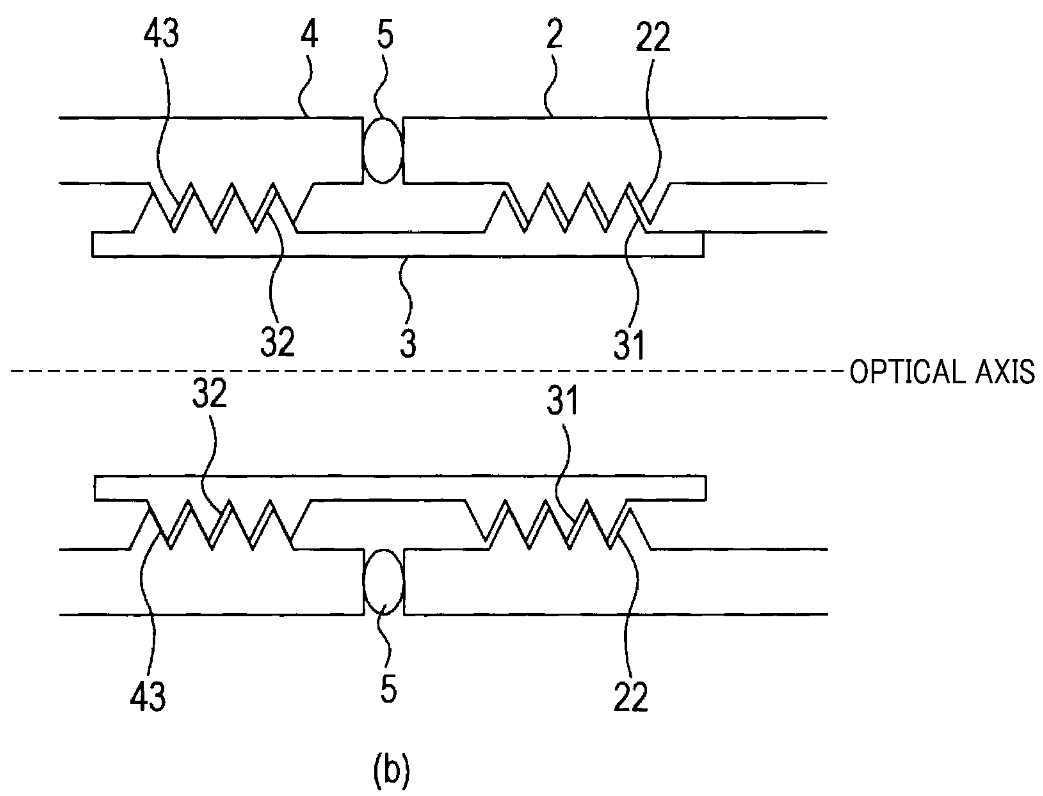

In a configuration in which the O-ring 5 is not provided as shown in (a) of FIG. 3, a gap is formed between the threads 22 and 31 when the barrel 3 is screwed into the holder 2. This gap causes backlash of the barrel 3 to the holder 2.

In this embodiment, however, the lens tube 1 has the O-ring 5 as shown in (b) of FIG. 3. Accordingly, the threads 22 and 31 reliably engage as shown in (b) of FIG. 3, thereby preventing backlash of the barrel 3 to the holder 2.

The barrel 3 and the cap 4 are tightened to each other in advance until the axis force is applied. Therefore, the O-ring 5 allows the threads 22 and 31 to engage with each other.

Moreover, the lens tube 1 of the present embodiment has the O-ring 5 as a configuration for preventing backlash. The O-ring 5 is disposed external to the holder 2. Accordingly, in the lens tube 1 of the present embodiment, the holder 2 does not need to be increased in size to house the O-ring 5, thereby achieving the small-sized holder 2.

Further, in the present embodiment, the O-ring 5 applies a uniform stress on the cap 4 about the axis of the barrel 3. Accordingly, the barrel 3 is prevented from being tilted with respect to the holder 2.

Further, according to the present embodiment, the threads 22, 31, 32, 43 are threaded in the same direction about the center axis of the barrel 3. Accordingly, when the lenses 30*a*, 30*b*, 40*a*, 40*b* are fixed by mounting the cap 4 on the barrel 3 and then the barrel 3 is mounted to the holder 2 by holding the cap 4, the lenses 30*a*, 30*b*, 40*a*, 40*b* are not disengaged. As a result, the barrel 3 and the cap 4 can be reliably fixed to the holder 2.

Further, in the present embodiment, the cap 4 includes the claw portion 41, and the barrel 3 includes the fixed ring 39. When the barrel 3 is screwed into the cap 4, the lenses 30*a*, 30*b*, 40*a*, 40*b* housed in the cap 4 and the barrel 3 are held and fixed between the claw portion 41 and the fixed ring 39. Accordingly, when the cap 4 is mounted to the barrel 3, the lenses 30*a*, 30*b*, 40*a*, 40*b* housed in the cap 4 and the barrel 3 are reliably fixed in the cap 4 and the barrel 3.

Further, in the present embodiment, a plurality of lenses 30*a*, 30*b*, 40*a*, 40*b* are held spaced from each other by the spacers 6*a*, 6*b*, 6*c*. Accordingly, the lenses 30*a*, 30*b*, 40*a*, 40*b* are arranged spaced from each other with a specific interval by the spacers 6*a*, 6*b*, 6*c*.

Other Embodiment

Although the embodiment is described above, the invention defined in the claims is not limited to the above embodiment, and various variations can be made to the invention.

(1) The O-ring 5 described in the above embodiment is merely an example of the stress applying portion, and the invention is not limited thereto. For example, the stress applying portion may be a wave washer having a wave shape formed at an equal interval in a circumferential direction. Any other component is also possible as long as it is formed in an annular shape so as to apply a uniform stress on the cap 4 about the axis of the barrel 3.

(2) Although the claw portion 41 is described as the first stopper in the above embodiment, the invention is not limited thereto. For example, the first stopper may be in any other protruding shape. Further, although the fixed ring 39 is described as the second stopper, the invention is not limited thereto. For example, a protrusion which works in a similar manner to the fixed ring 39 may be formed in the barrel 3 as the second stopper.

(3) In the above embodiment, the lenses 30*a*, 30*b* in the barrel 3 are configured to be held and fixed between the lens 40*a* and the fixed ring 39. However, the invention is not limited thereto. For example, the claw portion 41 may be disposed at a position that abuts against the spacer 6*b* or the lens 30*a* when the cap 4 is mounted to the barrel 3 so that the lenses 30*a*, 30*b* are fixed between the claw portion 41 and the fixed ring 39 when the cap 4 is mounted to the barrel 3.

Further, when the lenses 40*a*, 40*b* are necessary, the barrel 3 may be configured to have a sufficient length to house the lenses 40*a*, 40*b* so that the lenses 30*a*, 30*b*, 40*a*, 40*b* are held and fixed between the claw portion 41 and the fixed ring 39 in the barrel 3. In this case, a spacer may be interposed between the lenses as appropriate.

(4) In the above embodiment, the CCD element is described as the imaging element that constitutes the imager 91. However, the invention is not limited thereto. For example, the imaging element may be any element such as CMOS (complementary metal-oxide semiconductor) element as long as it is an imaging element.

(5) Although the lens tube 1 in the above embodiment is described to be used for a front monitoring camera of vehicle, the invention is not limited thereto. For example, the lens tube may also be applied to an imaging system including other vehicle camera such as a rear monitoring camera and a side monitoring camera of the vehicle, and a camera for other application than the vehicle.

REFERENCE SIGNS LIST

1 Lens tube
2 Holder
3 Barrel
4 Cap
5 O-ring
6*a*-6*c* Spacer
20 Large-diameter cylindrical portion
21 Small-diameter cylindrical portion
22 Thread
30*a*, 30*b* lens (first lens)
31 Thread

32 Thread
39 Fixed ring (second stopper)
40*a*, 40*b* Lens (second lens)
41 Claw portion (first stopper)
42 Hole portion
43 Thread
90 Substrate
91 Imager

The invention claimed is:

1. A lens tube comprising:
a barrel configured to house at least one first lens;
a holder fixed to a substrate in which an imager is arranged, the holder being mounted to one end of the barrel in an axial direction of the barrel such that an optical axis of the first lens and an optical axis of the imager are aligned with each other; and
a cap configured to house at least one second lens and is mounted to the other end of the barrel in the axial direction, wherein:
a first spacer is arranged to be sandwiched between the first lens and the second lens;
the cap and the barrel are engaged with each other by a thread structure; and
a first axial range in which the first spacer is arranged in the axial direction is at least partially overlapped with a second axial range in which the cap and the barrel are engaged with each other in the axial direction.

2. The lens tube according to claim 1, wherein:
a space in which the barrel is inserted is formed in the cap;
a first thread is formed on an inner surface of the space in the cap;
a second thread is formed on an outer surface of the barrel; and
the first thread and the second thread are engaged with each other to fix the second lens.

3. The lens tube according to claim 1, wherein:
a first space in which the second lens is housed and a second space in which the barrel is inserted are formed in the cap; and
the second lens is not housed in the second space.

4. The lens tube according to claim 1, wherein:
a first space in which the second lens is housed and a second space in which the barrel is inserted are formed in the cap;
the first space in which the second lens is housed is formed to have a diameter smaller than a diameter of the second space in which the barrel is inserted; and
a step portion is formed at a boundary portion between the first space in which the second lens is housed and the second space in which the barrel is inserted.

5. The lens tube according to claim 2, wherein:
the first axial range of the first spacer is at least partially overlapped with the second axial range in where the first thread of the cap and the second thread of the barrel are engaged with each other in the axial direction when the barrel is screwed into the cap.

6. The lens tube according to claim 2, wherein:
the first axial range of the first spacer is at least partially overlapped with the second axial range in which the first thread in the inner peripheral surface of the cap and the second thread in the outer peripheral surface of the barrel are engaged with each other.

7. A lens tube comprising:
a barrel configured to house at least one first lens;
a holder fixed to a substrate in which an imager is arranged, the holder being mounted to one end of the barrel in an axial direction of the barrel such that an optical axis of the first lens and an optical axis of the imager are aligned with each other; and
a cap configured to house at least one second lens and is mounted to the other end of the barrel in the axial direction, wherein:
a first spacer is arranged to be sandwiched between the first lens and the second lens;
a first thread is formed in the cap;
a second thread is formed in the barrel;
the second thread is screwed onto the first thread in the axial direction; and
the first spacer is arranged inside the barrel in an axial direction range where the second thread of the barrel is screwed onto the first thread of the cap.

8. The lens tube according to claim 7, wherein:
a space in which the barrel is inserted is formed in the cap;
the first thread is formed on an inner surface of the space in the cap;
the second thread is formed on an outer surface of the barrel; and
the second thread on the inner surface of the barrel is screwed onto the first thread on the outer surface of the cap in the axial direction to fix the second lens.

9. The lens tube according to claim 7, wherein:
a first space in which the second lens is housed and a second space in which the barrel is inserted are formed in the cap; and
the second lens is not housed in the second space.

10. The lens tube according to claim 7, wherein:
a first space in which the second lens is housed and a second space in which the barrel is inserted are formed in the cap;
the first space in which the second lens is housed is formed to have a diameter smaller than a diameter of the second space in which the barrel is inserted; and
a step portion is formed at a boundary portion between the first space in which the second lens is housed and the second space in which the barrel is inserted.

11. The lens tube according to claim 8, wherein:
the first spacer is arranged inside the barrel in the axial direction range where the second thread of the barrel is screwed onto the first thread of the cap when the barrel is screwed into the cap.

12. The lens tube according to claim 8, wherein:
the first spacer is arranged inside the barrel in the axial direction range where the second thread in the outer peripheral surface of the barrel is screwed onto the first thread in the inner peripheral surface of the cap.

13. The lens tube according to claim 7, wherein:
the first spacer is housed in the barrel and arranged closer to the cap than the second spacer.

14. The lens tube according to claim 7, wherein:
the barrel and the holder are formed separately from each other.

15. The lens tube according to claim 1, wherein:
the barrel and the holder are formed separately from each other.

16. The lens tube according to claim 1, wherein:
the first axial range of the first spacer is entirely overlapped with the second axial range in which the cap and the barrel are engaged with each other in the axial direction.

17. A lens tube comprising:
a substrate in which an imager is mounted;
a barrel that houses at least one first lens and is positioned on a side of the substrate in which the imager is arranged; and a cap that houses at least one second lens and is positioned in a direction opposite to the substrate in an axial direction of the barrel, wherein:

a first spacer is arranged to be sandwiched between the first lens and the second lens; and a first axial range in which the first spacer is arranged in the axial direction is at least partially overlapped with a second axial range in which the cap and the barrel are engaged with each other in the axial direction.

* * * * *